(12) United States Patent
Bedetti et al.

(10) Patent No.: US 9,759,599 B2
(45) Date of Patent: Sep. 12, 2017

(54) WEIGHING DEVICE HAVING INDUCTIVE SENSING ELEMENTS

(71) Applicant: WITHINGS, Issy les Moulineaux (FR)

(72) Inventors: Thomas Bedetti, Paris (FR); Antoine Joussain, Paris (FR); Eric Carreel, Meudon (FR)

(73) Assignee: WITHINGS, Issy les Moulineaux (FR)

( * ) Notice: Subject to any disclaimer, the term of this patent is extended or adjusted under 35 U.S.C. 154(b) by 20 days.

(21) Appl. No.: 14/739,868

(22) Filed: Jun. 15, 2015

(65) Prior Publication Data

US 2016/0363475 A1 Dec. 15, 2016

(51) Int. Cl.
*G01G 19/44* (2006.01)
*G01G 7/00* (2006.01)
*G01G 23/01* (2006.01)
*G01G 23/00* (2006.01)

(52) U.S. Cl.
CPC .............. *G01G 19/44* (2013.01); *G01G 7/00* (2013.01); *G01G 23/00* (2013.01); *G01G 23/01* (2013.01)

(58) Field of Classification Search
CPC .......... G01G 7/00; G01G 19/44; G01G 23/00; G01G 23/01
USPC ........................................ 177/201 R, 210 C
See application file for complete search history.

(56) References Cited

U.S. PATENT DOCUMENTS

| | | | | |
|---|---|---|---|---|
| 4,173,263 A | * | 11/1979 | Meeks | G01G 3/02 177/210 EM |
| 4,273,204 A | * | 6/1981 | Gillen | G01G 7/06 177/210 C |
| 4,281,727 A | * | 8/1981 | Meeks | G01G 19/44 177/128 |
| 4,405,025 A | * | 9/1983 | Yanagita | G01G 7/02 177/210 FP |
| 4,425,511 A | * | 1/1984 | Brosh | H03K 17/97 307/106 |
| 4,458,770 A | * | 7/1984 | Bucci | G01G 19/44 177/210 C |
| 4,503,922 A | * | 3/1985 | Brosh | G01G 3/14 177/210 EM |
| 4,679,643 A | * | 7/1987 | Bove | G01G 7/06 177/210 C |
| 4,765,421 A | * | 8/1988 | Newton | G01G 3/15 177/127 |

(Continued)

*Primary Examiner* — Randy Gibson
(74) *Attorney, Agent, or Firm* — Miller, Matthias & Hull LLP

(57) ABSTRACT

A thin personal weighing device comprising a bottom plate, extending along a reference plane, a top plate movably mounted with regard to the bottom plate along a direction perpendicular to the reference plane, four resilient elements directly interposed between the top and the bottom plate, four LC circuits positioned at a vicinity of an edge of the bottom plate, and a conductive material coating, arranged on the top plate, the four LC resonators and the at least conductive material coating exhibiting an inductance. Movement of the conductive material coating relative to each of the four LC resonators introduces a variation of the inductance. A computation unit detecting the variations of the inductance is electronically coupled with the LC resonators and configured to correlate the variations of the inductance with an actual weight placed on the weighing device. The thickness of the weighing device is less than 25 mm.

13 Claims, 6 Drawing Sheets

(56) References Cited

U.S. PATENT DOCUMENTS

| | | | | |
|---|---|---|---|---|
| 4,800,973 | A | * | 1/1989 | Angel .................... G01G 19/44 177/210 C |
| 5,524,490 | A | * | 6/1996 | Lautzenhiser .......... G01P 15/11 324/207.16 |
| 5,900,592 | A | * | 5/1999 | Sohns ...................... G01G 7/06 177/210 C |
| 2010/0012395 | A1 | * | 1/2010 | Mannhart ................ G01G 7/00 177/210 EM |
| 2010/0133016 | A1 | | 6/2010 | Mannhart et al. |
| 2017/0053087 | A1 | * | 2/2017 | Avramovich ........ A61B 5/4872 |

* cited by examiner

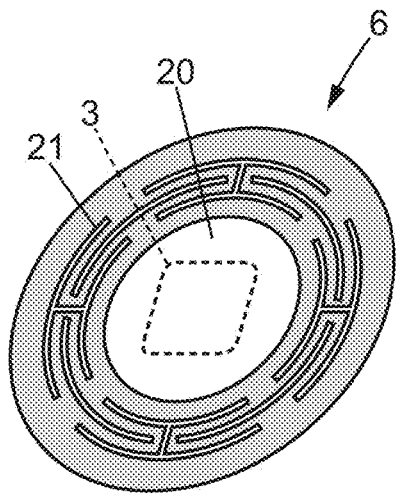 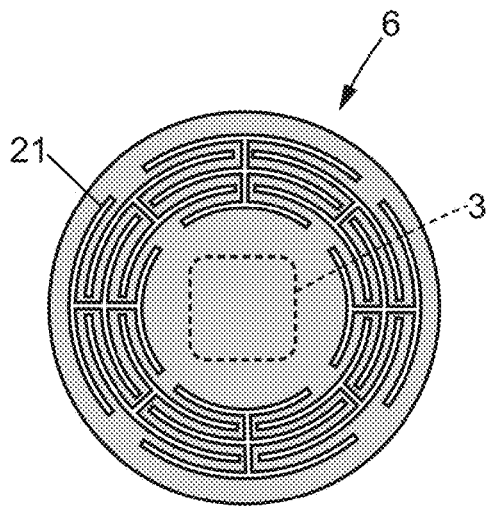
FIG. 9　　　　　FIG. 10
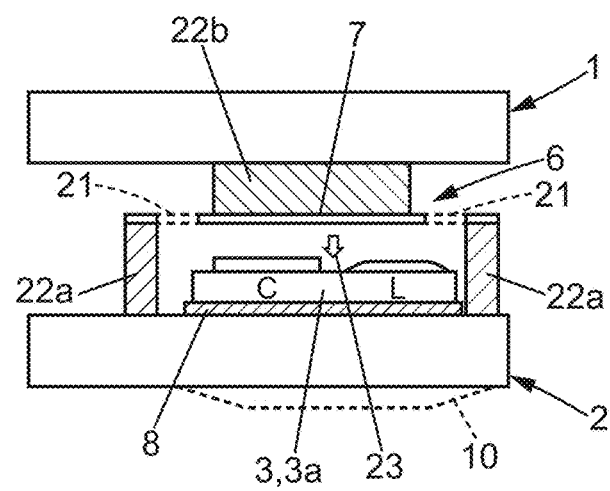
FIG. 11

WEIGHING DEVICE HAVING INDUCTIVE SENSING ELEMENTS

FIELD OF THE DISCLOSURE

The present invention relates to weighing devices and methods of weighing.

BACKGROUND OF THE DISCLOSURE

In particular, the present invention is related to a weighing device (or 'scale'), especially a weighing device suitable for personal use (weighing an individual). The weighing device employs at least four inductive sensors for detecting small variations in vertical motion of a plate of the weighing device.

US2010/0133016 discloses a scale having a base plate and a load plate located at a distance above the base plate for supporting an object to be weighed. Between the base plate and the load plate there are provided four spacing elements at the corners and the scale comprises four centrally arranged inductive sensors determining changes in distance between the base plate and the bed plate.

However, it turns out that errors may occur in such weighing devices when a load to be weighed is placed in an off-center position, or in particular if the elastic properties of the spacing elements are different from one another because of manufacturing deviation or other reason.

Moreover, in the known art, the flexibility of the top plate can be detrimental to the measurement accuracy, because as it flexes, the measured travel of the top plate at the sensing elements versus the travel of the top plate at the spacing elements are somewhat unrelated or at least uncertain.

Therefore it remains a need for improved weighing devices, which exhibit high accuracy and small thickness.

SUMMARY OF THE DISCLOSURE

To this aim, there is disclosed a thin personal weighing device, which comprises a bottom plate, extending along a reference plane (XY), a top plate, movably mounted with regard to the bottom plate, at least along a third direction (Z) perpendicular to the reference plane, at least four resilient elements, each directly interposed between the top plate and the bottom plate, at least four LC circuits each positioned at a vicinity of an edge of one of the top plate or the bottom plate, at least a conductive material coating, arranged on the other of the top plate or the bottom plate, the four LC circuits and the at least conductive material coating exhibiting an inductance; wherein during operation of the weighing device a movement of the at least conductive material coating relative to each of the four LC circuits along the third direction introduces a variation of the inductance; wherein the weighing device further comprises a computation unit electronically coupled with the LC circuits and programmed to detect the variations of the inductance; wherein the computation unit is configured to correlate the variations of the inductance with an actual weight placed on the weighing device; and wherein the thickness of the weighing device is less than 25 mm, and even less than 20 mm.

Thanks to these features, having the four LC circuits located near an edge of one of the top plate and the bottom plate (i.e. away from the center) allows to decrease a possible error caused by an off-center position of the weighed object on the top plate of the weighing device. Also having the four LC circuits located near an edge of one plate (i.e. away from the center) can decrease the detrimental influence of a possible flexure under weight of the top plate, which is particularly important when the target thickness is small and so the thickness of the top plate is under constraint. A small overall thickness allows to stow easily the scale.

In some embodiments, one might also use one or more of the following features:

- the thin personal weighing device comprises exactly four LC circuits, wherein positions of the four LC circuits form a rectangle; which is a particularly suitable configuration with regard to the points of pressure of the feet of an individual on the scale (corresponds to most common distribution of the weight on the scale);
- at least one of the top plate and the bottom plate has a rectangular shape, such that each of the four LC circuits is positioned in one of the corners of one of the top plate and the bottom plate; whereby the horizontal dimensions of the scale can be decreased to reduced values, typically below 35×35 cm, preferably not larger than 32×32 cm;
- the thin personal weighing device comprises exactly four resilient elements, wherein each of the four resilient elements occupies one of four quadrants of the rectangle defined by the positions of the four LC circuits; this ensures stability of an individual standing on the scale and ensures that the elastic deformation of each resilient element in one of the four quadrants, and the corresponding variations of distance between the top plate and the bottom plate, are directly correlated with the corresponding LC circuit belonging to that particular quadrant;
- the number of the at least four resilient elements is the same as the number of the at least four LC circuits, and the at least four resilient elements and the at least four LC circuits are arranged in pairs; pairing the resilient elements and the LC circuits so each resilient elements and the corresponding LC circuit are in close vicinity of each other may further help to increase sensitivity of the induction sensing setup of the scale, and allows an efficient parametrization learning (calibration) of each pair;
- the at least four resilient elements are in form of an annular spring, preferably a steel wave spring;
- each of the at least four LC circuits is arranged in the middle of the corresponding annular spring; which enhances integration and improves position compromise together with reduced horizontal size;
- the at least four resilient elements are in form of a diaphragm spring, preferably a symmetric diaphragm spring;
- each of the at least four LC circuits is arranged in the middle of the corresponding diaphragm spring;
- the computation unit comprises a plurality of sets of calibration parameters, such that each set of calibration parameters is allocated to one pair of the resilient element and the LC circuit; with this provision possible manufacturing deviations and non-linearity can be taken into account, for each pair of resilient element + and LC circuit;
- the at least four LC circuits are positioned on the bottom plate, and the at least conductive material coating is formed by at least a layer of the top plate; thereby, the top plate can be a very simple part, made of metal or having a metal layer underside;
- the thin personal weighing device further comprises a ferrite layer at the back of each of the at least four LC circuits; this renders LC resonance only sensitive to the proximity of the opposed conductive layer at the front side, and insensitive to the supporting plate at the back side; each LC circuit primarily senses relative movement between itself and the corresponding conductive material coating placed on the opposite plate; however, due to the high sensitivity of each LC circuit it may occur that the LC circuit also detects background signals interfering with the changes of inductance generated be the movement of the conductive material coating; for this reason the ferrite layers are positioned close to each LC circuit so as to shield off any potential background signals coming from directions different than in which the conductive material coating is arranged; when the LC circuits are placed on the bottom plate and the conductive material coating is in front of them, it is desirable to shield off background signal coming from the back of the LC circuits, which is achieved by placing a ferrite layer at the back of each LC circuit;

the thickness of the weighing device is less than 20 mm; this improves stowing possibilities, the thickness of the weighing device is less than 16 mm preferably about 15 mm; this further improves stowing possibilities, the changes in distance between the conductive material coating and each of the at least four LC circuits are smaller than or equal to 2 mm; thereby allowing to achieve a small overall thickness.

Another aspect of the invention is that it provides a method of calibration of a personal weighing device comprising:

placing a reference weight in the centre and successively over each position of at least four LC circuits on a top plate of the weighing device, acquiring calibration data from each of the at least four LC circuits and for each position of the reference weight in a computation unit, storing the calibration data in the computation unit, so that the actual weight measured with the weighing device is determined based on the stored calibration data.

The calibrated scale offers improved reliability, since it takes into account potential non-linearity of the resilient elements resulting from manufacturing deviations and/or other causes.

BRIEF DESCRIPTION OF THE DRAWINGS

Other characteristics and advantages of the invention will readily appear from the following description of one of its embodiments, provided as a non-limitative example, and of the accompanying drawings.

On the drawings:

FIGS. 9-10 show resilient elements in form of a diaphragm spring, FIG. 11 shows an embodiment where the diaphragm spring also serves as metal plate.

On the different Figures, the same reference signs designate like or similar elements.

DETAILED DESCRIPTION

Figure 1:
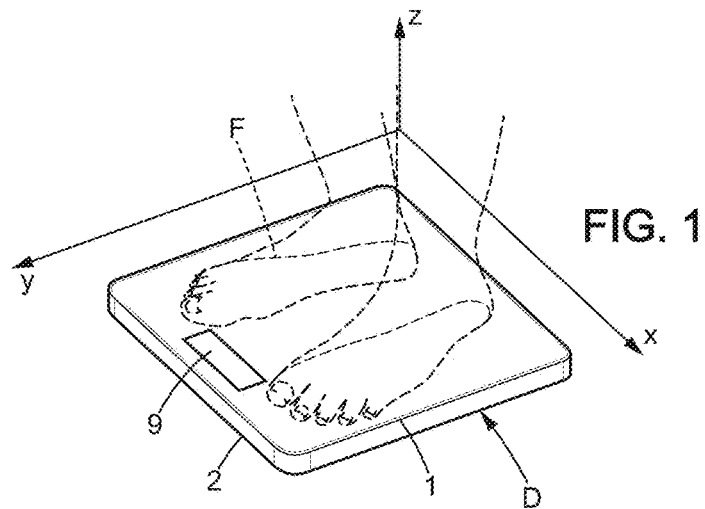
FIG. 1 is a top perspective view of a weighing device according to the present invention.
Figure 2:
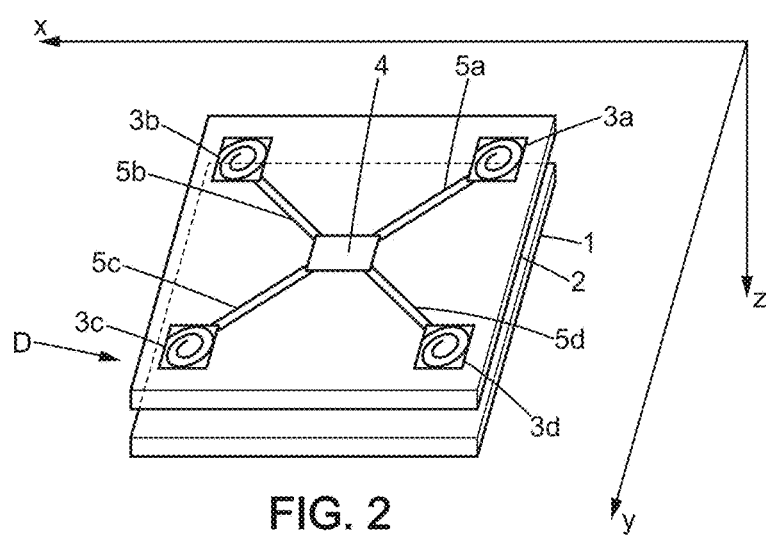
FIG. 2 is shows a schematic bottom perspective view of the device of FIG. 1, indicating positions of LC circuits, computation unit and the conductors on top of the bottom plate.

An example of a personal weighing device D (scale) according to the present invention is illustrated on FIGS. 1-4 of the drawings. The scale is adapted to measure weights in the range between 10-300 kg, and the ideal resolutions are obtained within the range between 30-200 kg. The scale includes a top plate 1 adapted with its shape and size for an object to be weighed. The scale is especially adapted for a personal use as a bathroom scale. The top plate 1 of the scale thus may have a flat upper surface, so that a user may conveniently stand on the scale. The upper surface of the top plate 1 could also be textured, so that it roughly resembles contours of human feet F, and/or the upper surface of the top plate 1 may be coated with a non-slippery material such as rubber or the like. Material of the top plate 1 could be metal, plastic, glass, or other suitable material.

The scale further comprises a bottom plate 2 elastically coupled with the top plate 1. The elastic coupling is achieved with at least four resilient elements 6a-6d positioned between the top plate 1 and the bottom plate 2. The top plate 1 and the bottom plate 2 extend generally in a common plane XY, defined by a first direction X and a second direction Y, and are movable with respect to each other at least along a third direction Z, perpendicular to the plane XY. Preferably, the change of distance between the top plate 1 and the bottom plate 2 should be equal to or less than 2 mm. Material of the bottom plate 2 may be also selected from metal, glass, plastic, or any other suitable material.

Generally, there is no restriction as for the shape of the top plate 1 and the bottom plate 2. They could be both of the same or similar shape, or in some embodiments they could also be of different shape, the shapes being for example one of a circle, a rectangle, a hexagon or even an asymmetrical or irregular shape such as rhombic shape or similar. The top plate 1 and the bottom plate 2 could have the same shape, but one of them could be larger than the other. In an exemplary embodiment displayed on FIG. 2-4 both the top plate 1 and the bottom plate 2 have a square shape, where both squares are having sides of the same size. In this embodiment the top plate 1 is positioned such that when viewed from the top, it overlaps the bottom plate 2. Thickness of the top plate 1 and the bottom plate 2, and the distance between them is chosen such that the overall thickness T of the scale along the third direction Z does not exceed 25 mm. In some embodiments, the thickness T of the scale could be advantageously reduced to less than 20 mm, and even preferably less than 18 mm.

The thickness T1 of the top plate 1 can be comprised between 2 and 6 mm, preferably between 4 and 6 mm. The thickness T2 of the bottom plate 2 can also be comprised between 2 and 6 mm, preferably between 2 and 4 mm.

As the thickness T of the scale is as less as 25 mm or smaller, the resilient elements 6a-6d (generally denoted by reference 6) may exhibit better properties, especially the elasticity of the resilient element 6a-6d can be maintained during operation of the scale, even in long-term horizon. The resilient elements are advantageously adapted to undergo as little deformation along the third axis Z of the scale as possible, keeping them well in the elastic region of the used material, so that the best possible performance of both the resilient elements 6a-6d and the scale is achieved. These features are particularly suitable in combination with use of the inductive sensors (LC circuits) as the LC circuits are sensitive to very little variations in position of the conductive material with respect to the LC circuit.

Figure 3:
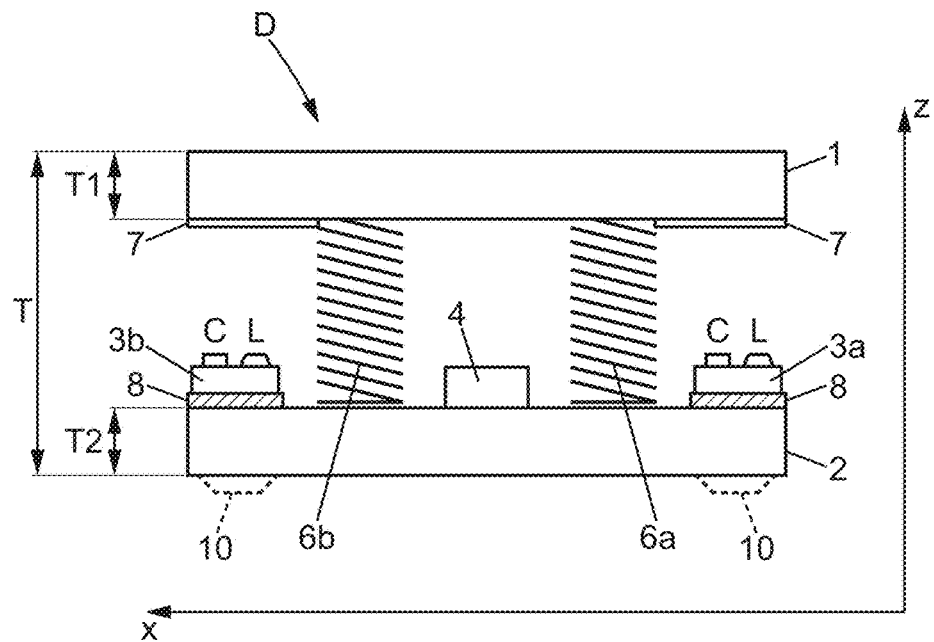
FIG. 3 shows a side schematic view of the device of FIG. 1; proportions of the device (especially in the z-direction are exaggerated on purpose for clarity of disclosure)
Figure 4:
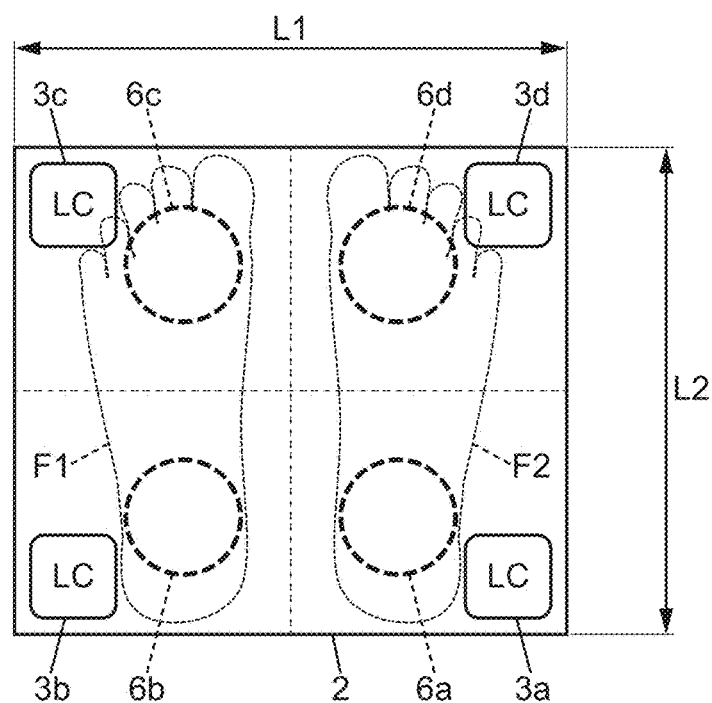
FIG. 4 shows positioning of the resilient elements with respect to the LC circuits according to one embodiment of the invention.

On the bottom of the bottom plate 2, as shown of FIG. 3, there may be optionally arranged a set of legs 10, so that the bottom plate 2 does not come in direct contact with the floor, or the surface it is standing on. Such legs prevent damaging of the bottom plate 2 as well as help to keep stability of the scale during use. As the scale of the present invention are especially suitable for use as bathroom scale, and as there might be water on the bathroom floor, the legs also prevent the scale and particularly the bottom plate 2 from coming into contact with the water and thus getting wet. The height pf the legs, although small, is not comprised in the above-mentioned overall thickness denoted T.

The scale further comprises at least four LC circuits 3a-3d, where each of the LC circuits serves as an inductive proximity sensor detecting small variations in distance between the top 1 and the bottom plate 2. As illustrated, the LC circuits 3a-3d (generally denoted by reference 3) are positioned on the bottom plate 2, while the top plate 1 includes at least a conductive material coating 7.

Of course, the inverse configuration with LC circuits 3a-3d on the top plate 1 and the conductive material 7 on the bottom plate 2 is also considered.

Each of the LC circuits 3a-3d is positioned at a vicinity of an edge of one of the top plate 1 or the bottom plate 2, namely, its center is located, from the plate edge/border, at a distance less than 20% of the overall plate dimension (L1,L2).

The LC circuits 3a-3d and the conductive material 7 exhibit an inductance, the changes of which are detected by the LC circuits 3a-3d. The large sensitivity of the inductive sensing setup of the present invention enables to measure the changes in distance of the two plates as little as on the order of 1 µm.

The combination of highly sensitive inductive sensors 3a-3d and the thickness T of the scale being as little as 25 mm, 20 mm or smaller, helps to increase stowing possibilities (under a piece of furniture, easier to transport). In a particular embodiment, where the resilient elements 6a-6d are designed to mediate changes between the two plates ranging between 0 mm to 2 mm, the effectivity of the scale is even further improved. The thin design of scale with small variations between the top plate 1 and the bottom plate 2 ensures that the resilient elements 6a-6d operate in a highly elastic region, thus improving the precision of the scale. The resilient elements 6a-6d of such scale are also predisposed to experience decreased changes in their elastic properties even in a long-term and/or frequent use of the scale. Furthermore, the thin personal scale is also convenient to be kept on places with limited storage space available.

Another advantage is that the scale is based on as simple mechanical interaction of its functional components as possible. In fact, there are no mechanical couplings used in the present scale, except for the mechanical coupling between the top plate 1 and the bottom plate 2 through the resilient elements 6a-6d. More particularly, the resilient elements 6a-6d, the LC circuits 3a-3d and the conductive materials 7 are not coupled with one another in any mechanical way. This introduces more degrees of freedom in choice of particular positions of these elements on the scale. Especially, it should be noted that there are almost no constraints to the positioning of the LC circuits dictated by the construction or an external appearance of the scale. Similarly, there are almost no constraints as for the position of the conductive materials 7 as long their function of generating variations of inductance is maintained in the device D.

Moreover, it is advantageous that the only mechanical deformation takes place within the resilient elements 6a-6d. More particularly, the LC circuits 3a-3d and the conductive materials 7, i.e. the components of the scale exhibiting an inductance—which is the physical quantity indicative of variations in distance between the top plate 1 and the bottom plate 2 and thus essential to determining the weight of the weighed object—are not subjected to any mechanical deformation. This means that the measurement of weight is made without contact.

Furthermore, another advantage of the present invention is that the components experiencing mechanical deformation, i.e. resilient element 6a-6d, are spatially separated from the functional elements, i.e. the LC circuits 3a-3d and the conductive materials 7. In other words, resilient elements 6a-6d are distinct from the conductive materials 7 and from the LC circuits 3a-3d, which again introduces more freedom in final selection of positions of the LC circuits 3a-3d and the conductive materials 7. Therefore, as far as the physical arrangement of the components of the scale is concerned, the resilient elements 6a-6d, the conductive material 7 and the LC circuits 3a-3d do not form a unit, and can be placed more freely on the scale when compared with the scale as know from the prior art.

Therefore, as will be described in further paragraphs, the present invention further addresses an arrangement of the functional elements of the scale (LC circuits, resilient elements) in order to increase the precision of the scale and to decrease its size, as well as a method of calibration of the scale taking into account possible non-linear characteristics of the resilient elements 6a-6d.

The four LC circuits 3a-3d are disposed on the bottom 2 plate, where they are distributed along an edge of that plate. The distribution of the LC circuits 3a-3d is substantially uniform along the whole circumference of the plate. Typically, the LC circuits 3a-3d may be located one in the middle of each opposite side and/or each corner of a rectangle, or one in the middle of each side and/or each corner of a pentagon, or similarly for other shapes of the plate.

In a preferred embodiment, there are exactly four LC circuits 3a-3d, positions of which form a rectangle. For example, as displayed on FIG. 2, the bottom plate 2 may be a rectangle and the LC circuits 3a-3d may be positioned each in one corner of such plate. In another example, the bottom plate 2 is a circle and the four LC circuits 3a-3d are each positioned in one corner of a square inscribed to that circle. Same configurations are possible with LC circuits 3a-3d on the top plate 1. Arranging the LC circuits 3a-3d in a rectangle helps to reduce horizontal dimensions L1, L2 of the scale and thus save manufacturing material. The L1 can thus be less than 35 cm, and even less than 32 cm and similarly L2 can be less than 35 cm and even less than 32 cm.

The resilient elements 6a-6d are sandwiched between the top 1 and the bottom plate 2, and could be formed for example by silicon pad, diaphragm spring or annular spring, and more specifically a flat annular spring. Other elastic components and materials may also be possible as long as requirements on elastic restoring force are fulfilled. In an embodiment, the resilient elements 6a-6d are in form of annular springs as shown of FIG. 8. The annular spring has an open area 20 in the middle thereof and a wire winding around this central area. The open area 20 may be used a place suitable for positioning an LC circuit 3a-3d. The annular spring could be in form a flat annular spring. The winding of the flat spring is such that it has flat upper and lower surfaces. Moreover, winding of the spring could be such that the wire in upper parts of the spring is not spaced equidistantly form the wire directly thereunder. The wire can be curved, and more specifically it could form a wave-like structure. The upper part of the wire in the spring might thus be in close contact with the part of the wire directly underneath it at some points of the spring, as illustrated by reference 64 in FIG. 8, while at other points of the spring upper wire is spaced apart from the wire below it, as illustrated by reference 65 in FIG. 8. The points where the neighbouring parts of the spring wire are in close contact 64 and the points where the neighbouring part of the spring wire are spaced apart 65 may be alternating periodically.

In an alternative embodiment, the resilient elements 6a-6d are in form of diaphragm springs, preferably symmetrical diaphragm springs. Examples of such diaphragms are shown on FIGS. 9 and 10. Such diaphragms can be formed as punched round metal thin plate having a peripheral rim and a center portion and an elastic structure 21 radially interposed between the peripheral rim and the center portion. The elastic structure extends annularly around the center portion and is made of a plurality of arcuate strips linked to one another by thin bridges. The elastic area 21 may have a symmetric pattern with respect to the center of the diaphragm spring. Advantageously, there is no parasitic movement when a load perpendicular to the diaphragm plane is plied, and since there is a very low hysteresis in the flexure movement, it can be neglected.

Figure 8:
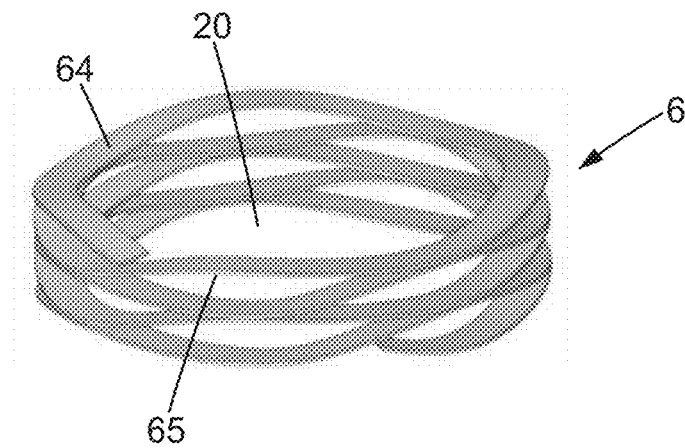
FIG. 8 illustrates an exemplary resilient element in form of an annular spring.

Similarly to the annular spring of FIG. 8, the diaphragm spring of FIG. 9 includes an open area 20 in the center portion, where an LC circuit 3a-3d may be placed. On the contrary, the diaphragm spring of FIG. 10 has a solid continuous center portion.

FIG. 11 shows an alternative design of the scale D, where the resilient elements 6 are in form of diaphragms similar to that of FIG. 10, comprising an elastic area 21, a solid center portion forming the abovementioned conductive material 7. The peripheral rim of the resilient element as shown of FIG. 11 is supported from below by a lower annular support 22a. The lower support 22a is interposed between the diaphragm 6 and the bottom plate 2. The lower support 22a is made of a robust material, such that this material sustains pressure exerted on in when the scale is loaded, without being deformed. Furthermore, an upper annular support 22b is interposed between the central portion of the diaphragm 6 and the top plate 1, such that when the scale D is loaded, the upper support 22b presses on the center portion of the diaphragm 6, thus forcing the elastic areas 21 to flex, and pushing the conductive material 7 in the direction of the arrow 23. The upper support 22b may be made of the same material as the lower support, having the same or similar physical properties.

In this embodiment, the LC circuits 3a-3d are placed in between the lower support 22a and under the conductive material 7 of the diaphragm 6. When the elastic areas 21 of the diaphragm 6 flex under the load being carried by the scale D and the conductive material is pressed downwards, variations in relative position of the conductive material 7 and the LC circuit 3a-3d are detected and handled similarly to what was described above.

Alternatively, an inverse configuration where the LC circuits 3a-3d are located on the top plate 1 is also possible, with inverse positions of upper and lower support 22a,22b.

An advantage of the configuration of FIG. 11 is that there is no need to introduce any conductive material coating 7 on the top 1 or bottom plate 2, as the center of the diaphragm 6 itself is conductive and enables to track variation in inductance without using any additional material. In that way, material may be saved and some additional freedom in positioning of the individual elements on the scale may be achieved.

In another alternative embodiment, the resilient elements 6a-6d are resilient pads made of elastic material in form of a pyramidal structure or a truncated segment. The material used can be urethane foam or gel, polyethylene foam, or silicone gel, for example the silicone gel known as 'Alpha-gel®' or 'Lambda-gel®', which are the trademarks of Taica.

The resilient elements 6a-6d are equally distributed over the surface of the plates. Preferably, the scale may comprise exactly four resilient elements 6a-6d, which are each positioned in one of the quadrants of the bottom plate 2. In the exemplary embodiment, as illustrated on FIG. 4, the four resilient elements 6a-6d are positioned in each quadrant of the square top plate 1 and the bottom plate 2. However, embodiments where the resilient elements 6a-6d each occupy one respective quadrant of a circle or a rhombus are also possible. When at least one of the top 1 and the bottom plate 2 is a rectangle, the resilient elements 6a-6d could be advantageously located in each respective corner of the rectangle.

Advantageously, the number of the resilient elements 6a-6d might be the same as the number of the LC circuits 3a-3d, so that the resilient elements 6a-6d and the LC circuits 3a-3d are provided in pairs only. This means that each one of a plurality of the resilient elements 6a-6d may be located in close vicinity to the respective one of the plurality of the LC circuits 3a-3d on the bottom plate 2. Preferably, each LC circuit 3a-3d may be positioned substantially in the middle of each respective resilient element 6a-6d. In that case, the resilient element 6a-6d has a form of the sort of annular spring as shown on FIG. 8 or a diaphragm of the sort illustrated on FIG. 9-10. Both of these constructions of resilient elements 6a-6d allow placing the corresponding LC circuit 3a-3d in the middle of the resilient element 6a-6d, such that the LC circuit 3a-3d is physically independent of the resilient element 6a-6d. This particular embodiment is illustrated on FIG. 5, where the resilient elements 6a-6d could be one of the annular spring and the diaphragm spring. In any case, the LC circuits 3a-3d are distinct from the resilient elements 6a-6d. Pairing the LC circuits 3a-3d and resilient elements 6a-6d can further help to reduce size L1b, L2b of the scale along X and Y axes.

Figure 5:
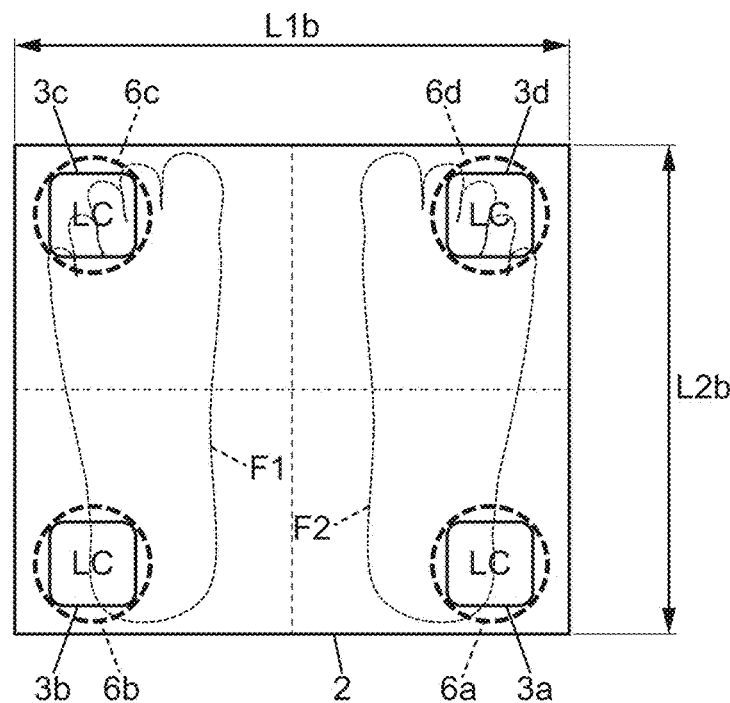
FIG. 5 shows positioning of the resilient elements with respect to the LC circuits according to another embodiment of the invention.

According to a particular suspect illustrated at FIG. 5, each LC circuit 3a-3d is placed in the middle of each respective resilient element formed as a ring likewise an annular spring, which improves integration and reduces size.

More precisely regarding the resilient elements 6a-6d, each resilient element may be formed as a wave steel ring as illustrated at FIG. 8. Several superposed bent metal strips 30 form a particularly compressible arrangement, as known per se.

Although the emphasis is made on spring-like resilient elements, similar results can be achieved for example with above mentioned silicon gels.

On the top plate 1, opposite the at least four LC circuits 3a-3d, is positioned at least a conductive material 7. The purpose of such conductive material 7 is that the conductive material 7 and the LC circuits 3a-3d exhibit an inductance, the changes of which are indicative of changes of distance between the two plates used to determine the weight of the weighed object. The conductive material 7 may be placed exclusively in front of each LC circuit 3a-3d, or it may be covering an entire plate. Alternatively, the conductive material 7 may be absent and the whole top plate 1 could be made from a conductive material, e.g. metal.

The scale further comprises a computation unit 4 electronically coupled with the LC circuits 3a-3d via set of conductors 5a-5d. The conductors 5a-5d may be in form of a set of wires or any other suitable conductive material. The conductors 5a-5d and the computation unit 4 are arranged in the same plate of the scale where the LC circuits 3a-3d are positioned and may be for example embedded in this plate. Preferably, the computation unit 4 is arranged in a middle region of the scale, but it could be also locate elsewhere if needed. The computation unit 4 is programmed to process variations of the inductance of the LC circuits 3a-3d and the conductive material 7 detected by the LC circuits 3a-3d. The computation unit 4 thus links the data acquired by the LC circuits 3a-3d with an actual weight placed on the top plate 1.

When the resilient elements 6a-6d and the LC circuits 3a-3d are arranged in pairs, the computation unit 4 may further comprise a plurality of sets of calibration parameters, such that each set of calibration parameters is allocated to one pair of the resilient element and the LC circuit. Therefore, characteristics of the individual resilient elements are taken into consideration. With the calibration of the scale, these characteristics do not introduce any errors in the measurement.

It is noted that the left and right footprints F1,F2 of the individual standing on the scale have main points of pressure whose location substantially coincides with the location of the resilient elements.

Figure 6:
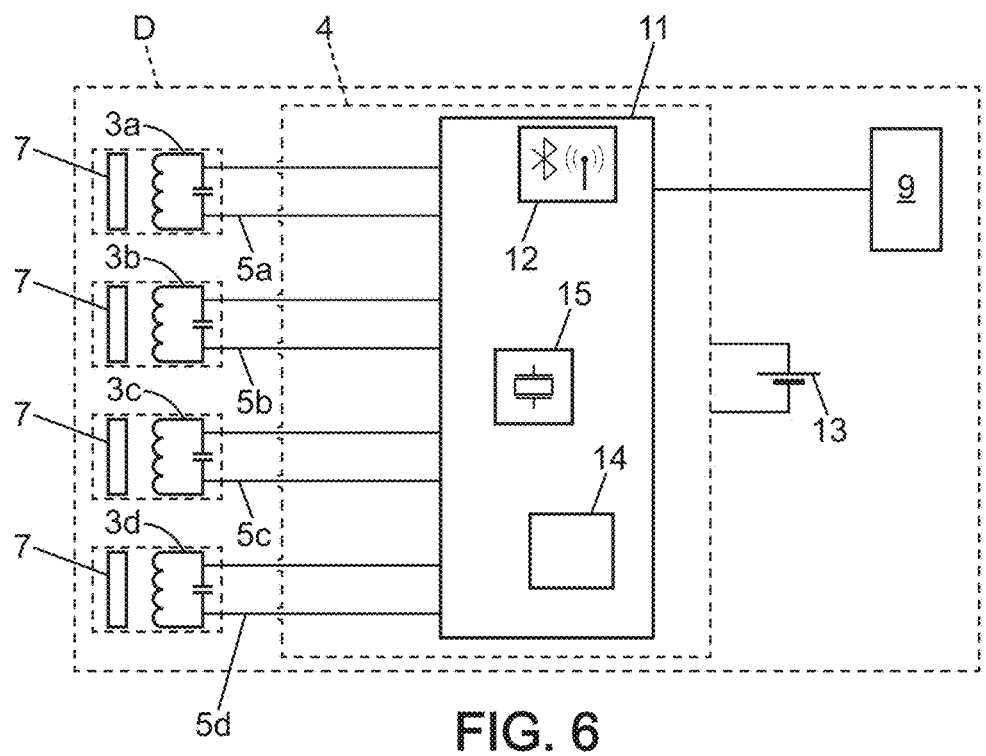
FIG. 6 is simplified scheme of the electric circuit of the weighing device of the present invention.

FIG. 6. shows a simplified schematic block diagram of the electronic circuits of the scale. The four LC circuits 3a-3d opposite the conductive material 7 and interconnected via the set of conductors 5a-5d with the computation unit 4.

The computation unit 4 includes a precise clock 15. The computation unit 4 may form a single electronic component with multichannel capabilities that handles analog signal processing regarding frequencies, where the signal generated in the LC circuits is converted into a digital signal and is further processed in a microcontroller 11. The multichannel computation unit 4 is wired directly to the microcontroller 11 with a preselected number of channels. In case of the embodiments of FIGS. 2-5, there are four channels, one corresponding to each LC circuit 3a-3d. Different number of channels is also possible, as well as adding several multichannel computational units 4 to the electronic circuit. For example, an addition of another four-channel computational unit 4 to the four-channel unit 4 of FIG. 6 enables one to easily double the number of available channels. Therefore, such multichannel units are preferred, especially for their versatility and freedom of choice in the final number of channels. Frequency deviations recorded in the microcontroller 11 are converted into a weight equivalent.

The microcontroller 11 also evaluates the calibration data by applying predefined mathematical operations and formulas that can be stored into the memory 14.

FIG. 6 also indicates a possibility of connecting of the scale with another device (for example a cell phone or computer) via a wireless connection 12. Additionally, the output data are shown on a display 9, which is directly communicating with the computation unit 4. The whole electronic system is powered by a source 13, for example a battery or any other suitable source of electrical voltage.

Figure 7:
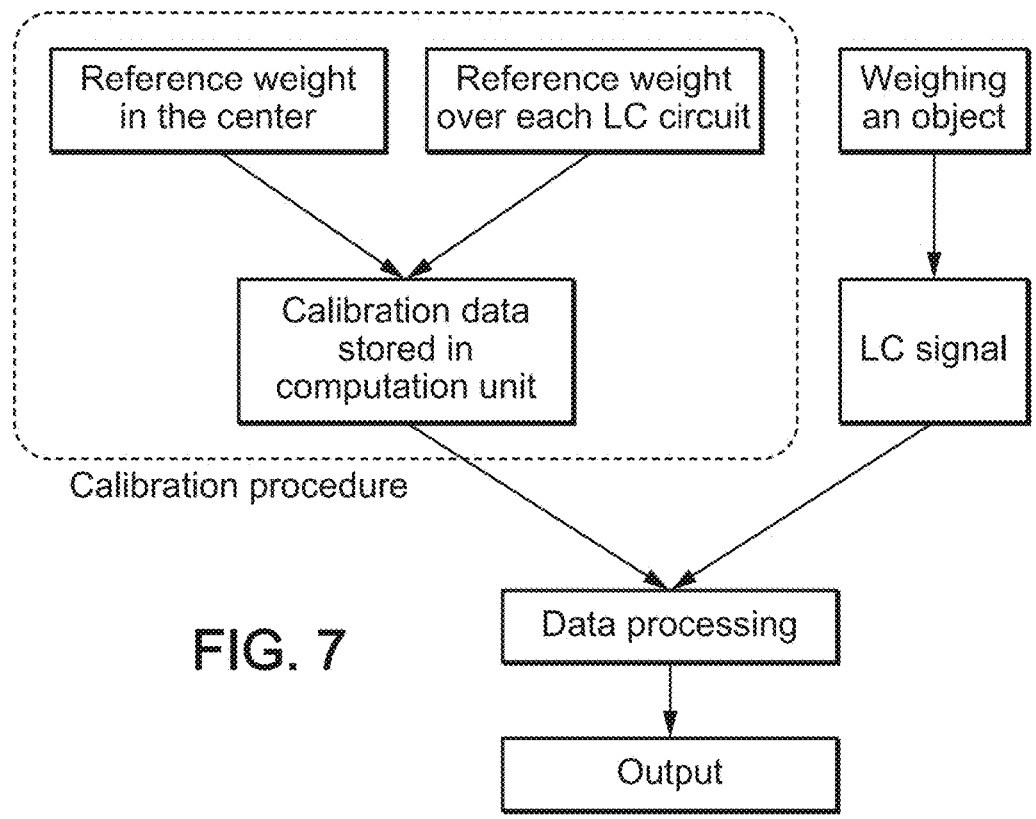
FIG. 7 is a flowchart of a calibration method implemented in the weighing device.

The method of calibration of the present scale is illustrated on FIG. 7 and comprises the steps of placing a reference weight substantially in the center of the scale and then successively over each LC circuits 3a-3d. In the following step, the data related to the reference weight are acquired by and stored in the memory 14 of the computation unit 4. Then after weighing an object on the scale, the variation in distance between the top plate 1 and the bottom plate 2, and subsequent changes in inductance of each LC circuit 3a-3d and the corresponding conductive material 7, generates an LC signal, which is transferred via conductors 5a-5d from each LC circuit 3a-3d into the computation unit 4. The computation unit 4 processes the LC signal based on the stored calibration data and computes on output value corresponding to the weight of the object placed on the top plate 1.

The scale is further provided with a display 9 showing at least the weight of the weighed object. The display 9 may, however, include other useful information depending on the user's preferences and/or additional functions of the scale. Various embodiments of the thin personal scale according to the present invention may for example indicate to the user, whether he/she should correct his/her position so as to achieve a properly balanced position on the scale. Other embodiments may be adapted for instance to indicate hearth rate, amount of body fat and/or the body mass index.

The display is preferably located on the top plate 1 of the scale as indicated on FIG. 1, although other arrangements with the display 9 provided on other parts of the scale are also possible. When located on the top plate 1 the display 9 may be directly electronically connected with the computation unit 4 (not shown in Figures), which may be also placed on the top plate 1. In this case, the LC circuits 3a-3d are also preferably positioned on the top plate 1, so that the conductors 5a-5d can be installed in the inside of the top plate 1.

Figure 12:
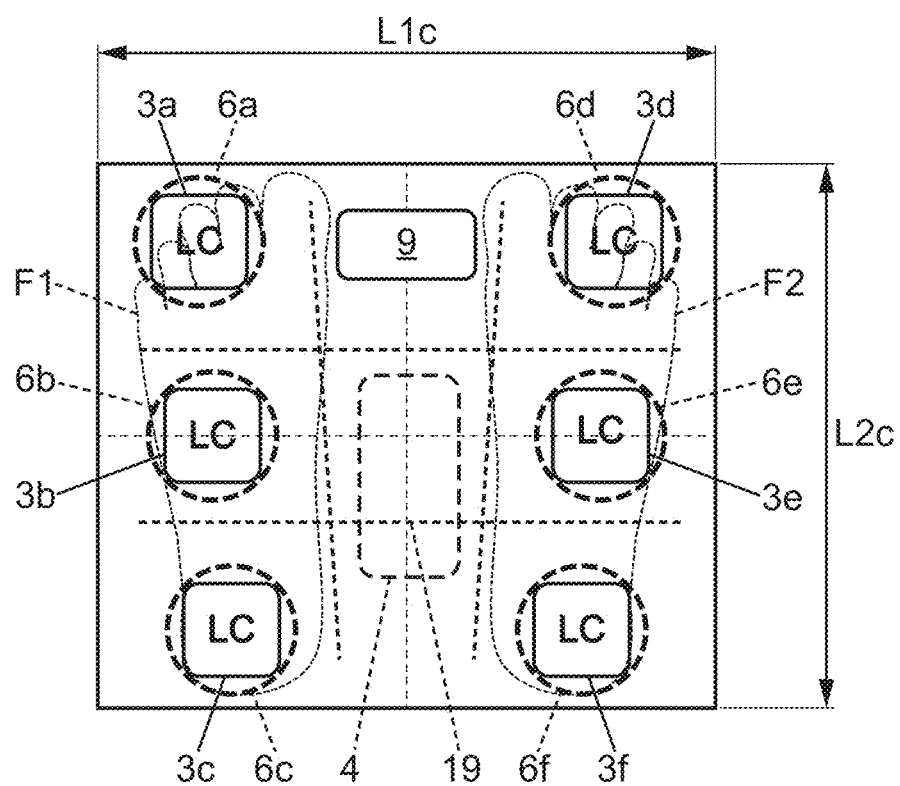
FIG. 12 is analogous to FIG. 4 and shows a further embodiment of the scale.

At FIG. 12, another embodiment of the scale comprises six LC circuits 3a-3f and six resilient elements 6a-6f, arranged by pairs. This allows to better distribute the weight to measure on six sensing units rather than four. This configuration also allows to decrease the thickness T1 of the top plate 1. The top plate 1 may be fitted with an array of reinforcement ribs 19 shown in dotted lines. Whatever may be the length of the feet of the individual, the footprints F1, F2 are always well balanced over at least two sensing elements. The scale according to the embodiment of FIG. 12 has the horizontal dimensions of L1c, L2c, similar to L1b, L2b.

The invention claimed is:
1. A thin personal weighing device comprising:
   a bottom plate, extending along a reference plane,
   a top plate, movably mounted with regard to the bottom plate, at least along a third direction perpendicular to the reference plane,
   at least four resilient elements, each directly interposed between the top plate and the bottom plate, and
   at least four LC circuits each positioned at a vicinity of an edge of one of the top plate or the bottom plate, at least a conductive material coating, arranged on the other of the top plate or the bottom plate, the four LC circuits and the at least conductive material coating exhibiting an inductance, wherein during operation of the weighing device a movement of the at least conductive material coating relative to each of the at least four LC circuits along the third direction introduces a variation of the inductance, wherein the weighing device further comprises a computation unit electronically coupled with the LC circuits and programmed to detect the variations of the inductance, and wherein the computation unit is configured to correlate the variations of the inductance with an actual weight placed on the weighing device, and wherein the thickness of the weighing device is less than 25 mm.

2. The weighing device according to claim 1 comprising exactly four LC circuits, wherein positions of the four LC circuits form a rectangle.

3. The weighing device according to claim 2, wherein the at least one of the top plate and the bottom plate has a rectangular shape, such that each of the four LC circuits is positioned at one of the corners of one of the top plate and the bottom plate.

4. The weighing device according to claim 2 comprising exactly four resilient elements, wherein each of the four resilient elements occupies one of four quadrants of the rectangle defined by the positions of the four LC circuits.

5. The weighing device according to claim 1, wherein the number of the at least four resilient elements is the same as the number of the at least four LC circuits, and wherein the at least four resilient elements and the at least four LC circuits are arranged in pairs.

6. The weighing device according to claim 5, wherein the at least four resilient elements are in form of a diaphragm spring or an annular spring.

7. The weighing device according to claim 6, wherein each of the at least four LC circuits is arranged in the middle of the corresponding diaphragm spring or annular spring.

8. The weighing device according to claim 5, wherein the computation unit comprises a plurality of sets of calibration parameters, such that each set of calibration parameters is allocated to one pair of the resilient element and the LC circuit.

9. The weighing device according to claim 1, wherein the at least four LC circuits are positioned on the bottom plate, and where the at least conductive material coating is formed by at least a layer of the top plate.

10. The weighing device according to claim 9, comprising a ferrite layer at the back of each of the at least four LC circuits.

11. The weighing device according to claim 1, wherein the thickness of the weighing device is less than 20 mm.

12. The thin personal weighing device according to claim 1, wherein the changes in distance between the at least conductive material coating and each of the at least four LC circuits are smaller than or equal to 2 mm.

13. A method of calibration of a personal weighing device comprising:

placing a reference weight in the centre and successively over each position of at least four LC circuits at a vicinity of an edge of a top plate of the weighing device, acquiring calibration data from each of the at least four LC circuits and for each position of the reference weight in a computation unit, and storing the calibration data in the computation unit, so that the actual weight measured with the weighing device is determined based on the stored calibration data.

* * * * *